June 17, 1958 G. K. C. HARDESTY 2,838,865
ILLUMINATED PANEL–METAL LAMINATION
CONDUCTS ELECTRIC CURRENT
Filed July 26, 1956 2 Sheets-Sheet 1

INVENTOR
George K.C. Hardesty

BY George Sipkin
B. L. Zangwill
ATTORNEYS

# United States Patent Office 2,838,865
Patented June 17, 1958

2,838,865

ILLUMINATED PANEL-METAL LAMINATION CONDUCTS ELECTRIC CURRENT

George K. C. Hardesty, Anne Arundel County, Md.

Application July 26, 1956, Serial No. 600,357

12 Claims. (Cl. 40—130)

(Granted under Title 35, U. S. Code (1952), sec. 266)

The invention described herein may be manufactured and used by or for the Government of the United States of America for governmental purposes without the payment of any royalties thereon or therefor.

This invention relates to the illumination of dials, panels, pointers and the like and particularly to edge-illumination of such elements. More particularly, this invention relates to the transmission of electric current from a source exteriorly of an edge-illuminated panel to an electric lamp, or lamps, within the panel.

Various means have heretofore been suggested for conducting electrical energy from a source without the structure to be illuminated to an illuminating lamp within such structure. When used with edge-illuminated panels or the like, the prior arrangements have exhibited certain inherent inefficiencies, limitations and disadvantages. Some of which are: shadow effects from separate electrical conductors; interference with the movement of pointers or the like; insufficient illumination; complicated structures; and/or inaccessible structures.

It is therefore a general object of the invention to provide an improved illumination system.

A further object of this invention is the provision of improved transmission of electrical energy to the light source of an illuminated panel or like structure.

A more specific object of this invention is the utilization of an otherwise functional element for transmitting electrical current to an illuminating lamp.

While not so limited, the instant invention has particular application to an illuminating system like that disclosed in applicant's copending patent application Serial No. 600,355, filed July 28, 1956, concurrently herewith, which issued as Letters Patent No. 2,805,505 on September 10, 1957.

Briefly, with the invention disclosed in applicant's Patent No. 2,805,505, a transparent, light-transmitting panel is laminated on all surfaces first with a polished metal having high specular reflectivity, then with a translucent material and then with an opaque material. Each such lamination is continuous and uninterrupted except for predetermined, juxtaposed light-transmitting openings in the metallic and opaque laminations, certain of which openings are for the transmission of light from a lamp into the transparent panel and other of which openings are to provide indicia or other markings on the obverse face of the panel; the indicia being formed by bringing integral portions of the translucent lamination into optical contact with the transparent panel through the indicia-forming openings in the obverse face of the metallic lamination. In this manner the brightness of the indicia is enhanced and the metallic lamination is sealed against corrosive atmospheres.

The instant invention makes use of one or more of the specular reflective metallic laminations of applicant's above-mentioned invention for transmitting electric current from a source outside of the panel to miniature lamp and socket assemblies that are embedded in the panel. Thus, without appreciably detracting from the reflective quality of the metallic lamination, the lamination assumes the added function of transmitting electric current to the lamp and socket assemblies. Either a single metallic lamination divided into two or more segments by a narrow insulating strip, or the two, top and bottom, metallic laminations, may be used to provide the two necessary electrical paths to and from the lamp sockets. The sockets may be connected in series or in parallel, as desired. By employing at least a large portion of the area of the metallic lamination, or laminations, sufficient electric current may be transmitted without undue heating or voltage drop and without appreciably increasing the thickness of the lamination.

Other objects and many of the attendant advantages of the invention will be readily appreciated as the same becomes better understood by reference to the following detailed description when considered in connection with the accompanying drawings in which like reference numerals designate like parts throughout the several views thereof and wherein.

Figure 1:
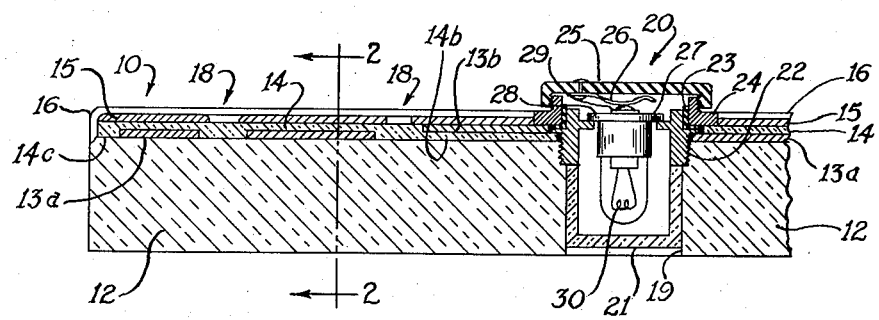
Fig. 1 is a fragmentary section through an illuminated panel illustrating one embodiment of the invention.
Figure 2:
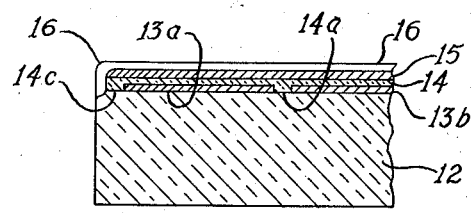
Fig. 2 is a vertical section taken in the plane of line 2—2 of Fig. 1.

Referring now to Figs. 1 and 2 of the drawing wherein, for purposes of illustration the invention is shown applied to a fragment of an edge-illuminated panel particularly adapted for use aboard ships, aircraft or the like, the structure designated generally by reference numeral 10, includes a panel or light-transmitting member 12 made of a highly transparent plastic. The light-transmitting panel comprises a relatively flat highly transparent plate, having its front and back surfaces in parallel relation to each other and preferably polished to provide smooth optical surfaces. The light-transmitting panel is preferably fabricated from an acrylic resin or methyl methacrylate plastic material of the thermoplastic type such as, for example, commercial "Plexiglas" or "Lucite." In this embodiment of the invention, the top surface, the surface nearest the viewer, of panel 12 is covered with a material from the class of materials which are relatively high in both specular reflectivity and electrical conductivity. This material may be polished-faced metal foil, polished metal sheets, evaporated metal deposited on the surfaces as a film, or oriented flake metallic pigmented coatings.

The polished metal material, hereinafter referred to as a metallic lamination, on the upper surface, the surface nearest the viewer, of the light-transmitting panel is divided into at least two segments 13a and 13b electrically separated in their entirety by a narrow air space or by a narrow strip of electrical insulating material 14a (Fig. 2). As shown, the segment 13a of the metallic lamination is placed in optical contact with the upper surface of the light-transmitting panel. The segment 13a is continuous, except for certain openings or interruptions therein, as pointed out hereinafter. The segment 13b also is in optical contact with the upper surface of the light-transmitting panel (Fig. 2), except as shown in Fig. 1, a portion of this lamination is separated from the light-transmitting panel by a layer or lamination 14b of translucent, electrical insulating material. Like the segment 13a, the segment 13b is continuous except for pre-located openings or interruptions therein.

A translucent coating or lamination 14, preferably white plastic, is superimposed upon each of the segments 13a and 13b of the metallic lamination and an opaque lamination 15, preferably black, is superimposed upon the translucent lamination. For convenience in assembly, the insulating strip 14a (Fig. 2) and the separating lamination 14b (Fig. 1) may be integral portions of the translucent lamination 14. As shown, the exterior edge portion of lamination 14 is brought into contact with the light-transmitting panel at 14c to thereby seal the metallic lamination against corrosive atmospheres. An overall protective coating 16 made of clear plastic and having low reflective characteristics encloses the entire obverse face of the panel.

As with the invention disclosed in applicant's Patent No. 2,805,505 indicia, indicated generally at 18, are formed by openings in the metallic lamination and by placing the translucent lamination in optical contact with the light-transmitting panel through such openings. To enhance the brightness of the indicia, the juxtaposed openings in the opaque lamination are made smaller than the openings in the metallic lamination.

Referring still to Fig. 1, the light-transmitting panel is provided with an opening 19 in which is located a lamp and socket assembly 20. This assembly includes a red filter 21, a flanged adapter 22, an insulating ring 23, a second adapter 24, a screw cap 25, a conductor 26, and a miniature lamp 27, all assembled in the manner shown. The lamp is formed with a rim terminal 28 in electrical contact with the flange of adapter 22 and with a base terminal 29 in electrical contact with adapter 24 through cap 25 and conductor 26. As shown, adapters 22 and 24 are in electrical contact, respectively, with segments 13a and 13b of the metallic lamination and are electrically insulated from each other by insulating ring 23. The segments 13a and 13b are connected in any suitable manner, not shown, to opposite sides of a suitable source of current. Thus the two necessary electrical paths are provided to and from the lamp.

In tracing the electric circuit, assuming that segments 13a and 13b are connected respectively, to the positive and negative sides of a source of electrical current, current flows from the source through segment 13a, adapter 22, rim terminal 28, lamp filament 30, base terminal 29, conductor 26, cap 25, adapter 24 and segment 13b back to the source.

The portion of segment 13b of the metallic lamination in Fig. 1 that is not in optical contact with the light-transmitting panel but rather separated therefrom by an area of the translucent coating is primarily for convenience of assembly in a manner adapting the invention to sockets of the general type shown. The optically reflective surface of the displaced portion of segment 13b (Fig. 1) will reflect back to the light-transmitting panel some of the light that penetrates the translucent lamination at this local area. Thus, even though this area of segment 13b is not in essentially direct optical contact with the light-transmitting panel, it is optically significant and fully electrically equivalent to the remainder of this segment and to segment 13a.

Figure 3:
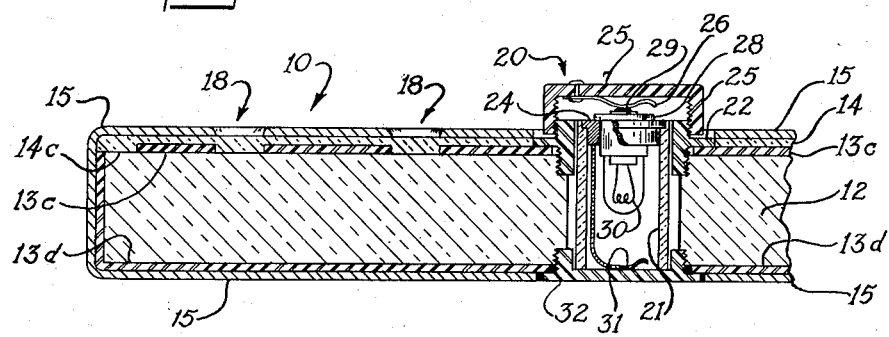
Fig. 3 is a fragmentary section similar to Fig. 1, illustrating a second embodiment of the invention.

In Fig. 3, wherein a second embodiment of the invention is illustrated, the parts are generally similar to those of Figs. 1 and 2, except with this second embodiment a specular reflective metallic lamination 13c is placed in optical contact with the upper or obverse surface of the light-transmitting panel 12, while a second specular reflective metallic lamination 13d is placed in optical contact with the bottom and peripheral surfaces of the panel. The lamp and socket assembly 20 comprises a first adapter 22 in electrical contact with the top metallic lamination 13c, an upper screw cap 25, a conductor 26, base terminal 29, lamp filament 30, rim terminal 28, a second adapter 24, a conductor 31, a lower screw cap 32 and a filter 21. As shown, the lower screw cap is in electrical contact with the metallic lamination 13d, and it supports the filter, which in turn supports the adapter 24. It is to be noted that the lamp and socket assembly of Fig. 3 permits the servicing of the lamp from either side of the panel; that is, the lamp is accessible by removing either the top or the bottom screw cap.

Referring still to Fig. 3, in tracing this electric circuit and assuming that the metallic lamination 13c is connected in suitable manner to the positive side of the source of electrical energy and that the metallic lamination 13d is connected to the negative side of such source, current will therefor flow from the source through lamination 13c, adapter 22, upper screw cap 25, conductor 26, base terminal 29, lamp filament 30, rim terminal 28, adapter 24, conductor 31, lower screw cap 32 and metallic lamination 13d back to the source of current.

In the embodiment of the invention illustrated in Fig. 3, the metallic laminations 13c and 13d contribute all of the optical functions outlined for the similar laminations of applicant's copending application, referred to above, with the additional function of transmitting current to the lamp and socket assembly. In this embodiment the upper and lower metallic laminations are electrically insulated from each other by the peripheral portion 14c of the translucent lamination.

While but one lamp and socket assembly has been shown in each of the illustrated embodiments of Figs. 1 and 3, a plurality of such assemblies may be used with either embodiment, and, by properly connecting or electrically isolating the metallic laminations, the lamps may be connected in series or in parallel as desired.

Figure 4:
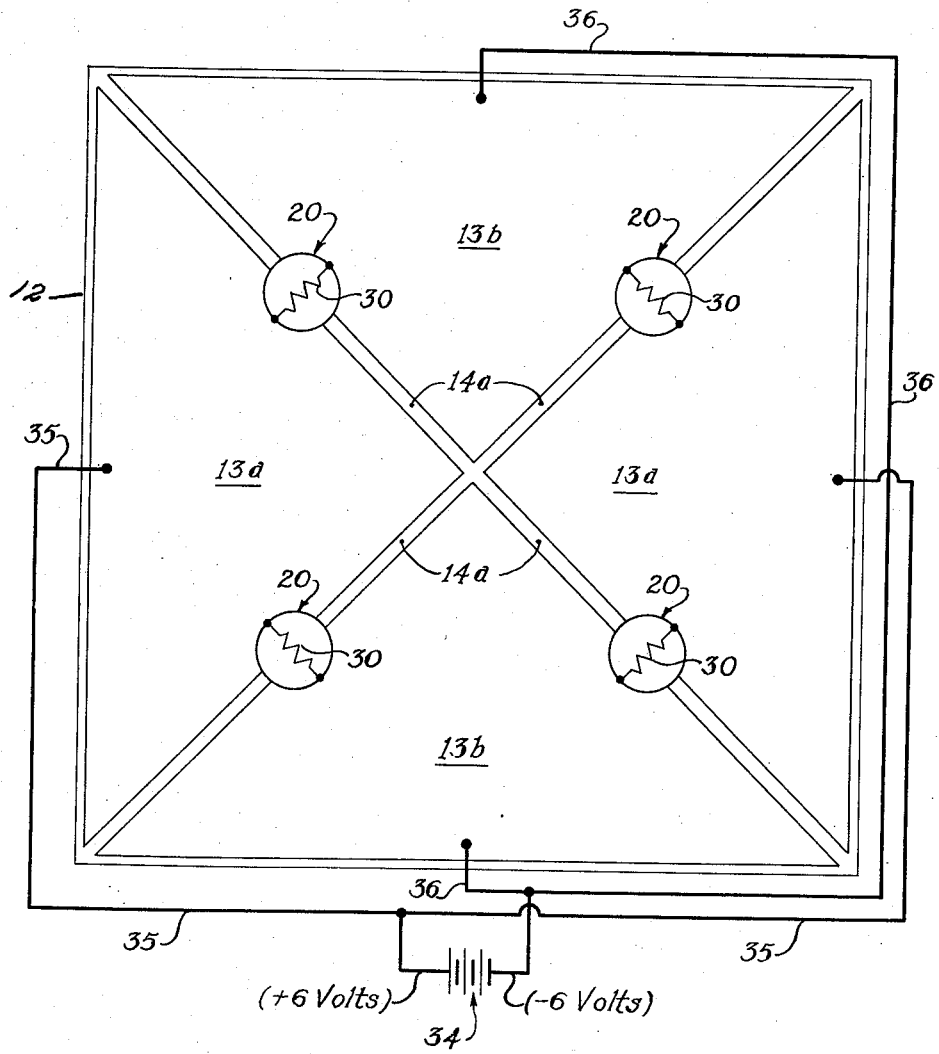
Fig. 4 is a diagrammatic plan view showing electric circuits between a source of electric current, a plurality of metallic laminations and a plurality of illuminating lamps.

Referring now to Fig. 4, which diagrammatically illustrates a manner of connecting a plurality of lamp assemblies to a source of electric current and which is particularly adapted for use with the embodiment of the invention illustrated in Figs. 1 and 2; that is, where only the upper or obverse surface of the light-transmitting panel is covered with a polished metal having high specular reflectivity. In this diagrammatic illustration, which may be considered a top plan of an illuminated panel, the metallic laminations are exposed to view by omitting the translucent and opaque laminations and the indicia or other markings.

In Fig. 4, the metallic lamination of high specular reflectivity that is optically bonded to the upper or obverse surface of the light-transmitting panel is divided into two pairs of segments 13a and 13b, separated from each other by narrow air spaces or strips 14a of electrical insulating material. Each of the segments is in the same plane and each is optically bonded to the obverse surface of the light-transmitting panel. Four lamp and socket assemblies 20 are shown, each having a filament 30. The positive side of a source of electrical current 34 is connected by a pair of conductors 35 to the pair of segments 13a, while the negative side of such electric source is connected by a pair of conductors 36 to the pair of segments 13b. In practice, the conductors 35 and 36 may be located around the peripheral edge of the panel and may be embedded in the edge portion 14c (Fig. 1) of the translucent lamination.

In tracing the current flow from the source to the lamps, current flows from the positive side of the source 34, through conductors 35, segments 13a, through the lamp assemblies including the filaments 30 to the segments 13b and back through conductors 36 to the negative side of the source of current. It is noted that the lamps are connected in parallel and in series, so that the burning out of one lamp will not interfere with the supply of current to the remaining lamps. Also, the insulating spaces or strip 14a are so narrow as to have substantially no effect on the high specular reflectivity of the metallic laminations; in fact, in practice, the plurality of segments function as an integral lamination insofar as concerns the optical characteristics of the metal.

In practicing the invention, either the top metallic lamination (Figs. 1 and 4) or both the top and bottom metallic laminations (Fig. 3) may be divided into suitable electrical paths in the manner of modern "printed" circuits. The discontinuities in the metal foil necessary to establish isolation between circuits are of little optical significance, since their total area is small. These conductors find ready application in circuits between panel lamps and their switches or dimming controls, but may if desired be used to control pilot lamps or other circuits more intimately associated with the electronic equipment on which illuminated panels are so often used.

Without further description, it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. An illumination system comprising a light-transmitting panel of transparent material having major front and back surfaces substantially in parallel planes operative for specular reflection of light therebetween, a first lamination of opaque high specular reflectance metal having a specular reflectance surface thereof bonded in optical contact with at least one major surface of said panel for increasing the specular reflection of light in said panel, a source of electric current exteriorly of said panel, an illuminating means located within an opening in said panel for introduction of light into the panel for specular reflection therethrough, and means including said metallic lamination for conducting electric current between said source of current and said illuminating means.

2. An illuminating system as set forth in claim 1 wherein said lamination of high specular reflectance metal is divided into a plurality of segments separated by a non-conducting material, with one of such segments electrically connected between one side of the source of current and of the illuminating means and with another of such segments electrically connected between opposite sides of the illuminating means and of the source of current.

3. An illumination system as set forth in claim 1 wherein the illuminating means includes a plurality of lamps located in spaced relation within openings in the light-transmitting panel, and wherein the lamination of high specular reflectance metal is divided into a plurality of segments electrically separated from each other, with certain of the segments electrically connected between one side of the electric source and one side of the lamps and with other of the segments electrically connected between opposite sides of the lamps and of the electric source.

4. An illumination system as set forth in claim 1 wherein a second lamination of opaque high specular reflectance metal is bonded in optical contact with a second face of the light-transmitting panel for further increasing the specular reflection of light in said panel, wherein the first metallic lamination is electrically connected between one side of the electric source and of the illuminating means and wherein the second metallic lamination is electrically connected between an opposite side of the electric source and of the illuminating means.

5. An illuminating system comprising a light-transmitting panel of transparent material having major front and back surfaces substantially in parallel planes operative for specular reflection of light therebetween, a first lamination bonded in optical contact with at least one major surface of said panel, said first lamination being selected from that class of materials which are opaque and relatively high in specular reflectivity for increasing the specular reflection of light within the panel and in electrical conductivity for conducting electric current therethrough, a source of electric current exteriorly of said panel, illuminating means within said panel, and means including said first lamination for conducting electric current between said source and said illuminating means.

6. An illuminating system as set forth in claim 5 wherein said illuminating means includes a plurality of electric lamps arranged in spaced relation within said panel, and wherein the first lamination includes a plurality of segments electrically insulated from each other, with one of said segments electrically connected between one side of the source of current and of the electric lamps and with another of the segments electrically connected between opposite sides of the electric lamps and of the source of electric current.

7. An illuminating system as set forth in claim 5 which includes a second lamination bonded in optical contact with the other major surface of the light-transmitting panel, said second lamination being selected from that class of materials which are opaque and relatively high in specular reflectivity for further increasing the specular reflection of light in said panel and in electrical conductivity for conducing electric current therethrough, wherein said first lamination is connected between one side of the source of current and of the illuminating means and wherein the other of the laminations is connected between opposite sides of the source of current and of the illuminating means.

8. An illumination system comprising a light-transmitting panel of transparent material having major front and back surfaces substantially in parallel planes operative for specular reflection of light therebetween, a first lamination bonded in optical contact with at least the front surface of the panel, said first lamination being selected from that class of materials which are opaque and relatively high in specular reflectivity for increasing the specular reflection of light in said panel and in electrical conductivity, for conducting electric current therethrough, a source of electric current exteriorly of said panel, an illuminating means so positioned within said panel as to transmit light rays thereinto for passage therethrough, means including said first lamination for conducting electric current from the source of current to the illuminating means, the first lamination on the front face of the panel being interrupted at desired areas thereof so as to provide openings for the transmission of light therethrough, a second lamination of translucent material superimposed on the first lamination and having integral portions thereof in optical contact with the transparent panel through the openings in the front surface of the first lamination to thereby form indicia, and a third lamination superimposed on said second lamination and having openings therein juxtaposed with the openings in the first lamination for exposing the indicia formed by the translucent lamination, and means formed in the laminations for regulating the brightness of the indicia.

9. An illuminating system as set forth in claim 8 wherein the areas of the openings in the first lamination are different from the areas of the openings in the third lamination to thereby form the means for regulating the brightness of the indicia.

10. An illuminating system as set forth in claim 8 wherein the area of the openings in the first lamination are larger than the area of the openings in the third lamination to thereby form the means for regulating the brightness of the indicia and enhance the brightness of the indicia.

11. An illuminating system as set forth in claim 8 wherein the first lamination is divided into a plurality of segments separated by an electrical insulating material, wherein one of said segments is electrically connected between one side of the source of current and of the illuminating means and wherein another of said segments is electrically connected between opposite sides of the source of current and of the illuminating means.

12. An illuminating system as set forth in claim 8 which includes a fourth lamination bonded in optical contact with the back surface of the panel, said fourth lamination being selected from that class of materials which are opaque and relatively high in specular reflectivity for further increasing the specular reflection of light in said panel and in electrical conductivity for conducting electric current therethrough, wherein the first lamination is electrically connected between one side of the source of current and of the illuminating means and wherein the fourth lamination is electrically connected between opposite sides of source of current and of the illuminating means.

References Cited in the file of this patent

UNITED STATES PATENTS

| | | |
|---|---|---|
| 2,660,824 | Neugass | Dec. 1, 1953 |
| 2,690,503 | Garland | Sept. 28, 1954 |
| 2,696,550 | Neugass | Dec. 7, 1954 |
| 2,702,340 | Thieblot | Feb. 15, 1955 |
| 2,723,342 | Neugass | Nov. 8, 1955 |